(12) United States Patent
Molony

(10) Patent No.: US 11,292,620 B1
(45) Date of Patent: Apr. 5, 2022

(54) AUTONOMOUS MOBILE MECHANICALLY DEPLOYED SPACEPORT TO PROVIDE A SELF-LEVELING STABLE LANDING PAD FOR LUNAR AND MARTIAN DESCENDING AND ASCENDING SPACECRAFT

(71) Applicant: Ian Peter Molony, Bastrop, TX (US)

(72) Inventor: Ian Peter Molony, Bastrop, TX (US)

( * ) Notice: Subject to any disclaimer, the term of this patent is extended or adjusted under 35 U.S.C. 154(b) by 194 days.

(21) Appl. No.: 16/847,469

(22) Filed: Apr. 13, 2020

Related U.S. Application Data

(60) Provisional application No. 62/954,839, filed on Dec. 30, 2019.

(51) Int. Cl.
| | |
|---|---|
| *B64G 1/62* | (2006.01) |
| *B64G 1/52* | (2006.01) |
| *B64G 5/00* | (2006.01) |
| *B64F 1/20* | (2006.01) |

(52) U.S. Cl.
CPC .............. *B64G 1/62* (2013.01); *B64F 1/20* (2013.01); *B64G 1/52* (2013.01); *B64G 5/00* (2013.01)

(58) Field of Classification Search
CPC .... B64G 1/62; B64G 1/52; B64G 5/00; B64F 1/20
See application file for complete search history.

(56) References Cited

U.S. PATENT DOCUMENTS

| | | | | |
|---|---|---|---|---|
| 5,845,875 | A | * | 12/1998 | Deel .................... B64G 5/00 244/63 |
| 8,424,802 | B2 | | 4/2013 | Tripier-Larivaud |
| 9,187,186 | B2 | | 11/2015 | Besenzoni |
| 2012/0080562 | A1 | * | 4/2012 | Auger .................... B64G 1/62 244/171.7 |
| 2012/0298796 | A1 | * | 11/2012 | Carreker .............. B64G 1/22 244/1 OOR |
| 2013/0068886 | A1 | | 3/2013 | Besenzoni |
| 2016/0311556 | A1 | * | 10/2016 | Knudsen .............. B64G 1/62 |
| 2018/0265196 | A1 | * | 9/2018 | Phillips .............. B64C 39/024 |

* cited by examiner

*Primary Examiner* — Rodney A Bonnette
(74) *Attorney, Agent, or Firm* — Plager Schack LLP; Mark H. Plager; Stephen Hallberg

(57) ABSTRACT

An autonomous mobile mechanically deployed spaceport is disclosed to provide a self-leveling stable landing pad for lunar and Martian descending and ascending spacecraft and which alleviates rocket plume blast effects upon surface soils and volatiles during spacecraft descent and ascent. The autonomous mobile mechanically deployed spaceport is a mechanically deployed unfolding flying landing pad to allow spacecraft to land on the Moon and Mars and alleviates rocket plume blast effects upon surface soils and volatiles.

10 Claims, 4 Drawing Sheets

AUTONOMOUS MOBILE MECHANICALLY DEPLOYED SPACEPORT TO PROVIDE A SELF-LEVELING STABLE LANDING PAD FOR LUNAR AND MARTIAN DESCENDING AND ASCENDING SPACECRAFT

CLAIM OF BENEFIT TO PRIOR APPLICATION

This application claims benefit to U.S. Provisional Patent Application 62/954,839, entitled "A MECHANICALLY DEPLOYED UNFOLDING FLYING LANDING PAD (OCULUS HIVE MOBILE SPACEPORT) TO ALLOW SPACECRAFT TO LAND ON THE MOON AND MARS WHICH WILL ALLEVIATE ROCKET PLUME BLAST EFFECTS UPON SURFACE SOILS AND VOLATILES," filed Dec. 30, 2019. The U.S. Provisional Patent Application 62/954,839 is incorporated herein by reference.

BACKGROUND

Embodiments of the invention described in this specification relate generally to terrestrial aerial vehicle landing surfaces, and more particularly, to an autonomous mobile mechanically deployed spaceport to provide a self-leveling stable landing pad for lunar and Martian descending and ascending spacecraft and which alleviates rocket plume blast effects upon surface soils and volatiles during spacecraft descent and ascent.

A rocket landing on the Moon, which lacks atmosphere to stop high velocity dust, ejects regolith (Lunar top soil, dust, and debris) particles in the range of multiple km/s with a significant fraction exceeding lunar escape velocity. Damaging impacts can occur over very long distances, even globally, and easily reaches spacecraft operating at high orbital altitudes.

Therefore, what is needed is a way to alleviate rocket plume blast effects upon surface soils and volatiles in a mobile spaceport landing pad system that allows spacecraft to land on the Moon and Mars.

BRIEF DESCRIPTION

A novel autonomous mobile mechanically deployed spaceport to provide a self-leveling stable landing pad for lunar and Martian descending and ascending spacecraft is disclosed. In some embodiments, the autonomous mobile mechanically deployed spaceport alleviates rocket plume blast effects upon surface regolith, including surface soils and volatiles, during spacecraft descent and ascent. In some embodiments, a plurality of flying autonomous mobile mechanically deployed spaceports are deployed as a fleet or swarm.

In some embodiments, the autonomous mobile mechanically deployed spaceport is designed to be utilized in multiple configurations to serve multiple varied missions. In some embodiments, the autonomous mobile mechanically deployed spaceport is capable of self-stowing to autonomously fold up in preparation for relocation. In some embodiments, the self-stowing capability makes it possible for the autonomous mobile mechanically deployed spaceport to be utilized in any and all of the multiple configurations. In some embodiments, after the autonomous mobile mechanically deployed spaceport is stowed and folded up, the autonomous mobile mechanically deployed spaceport prepares to launch for relocation. In some embodiments, the autonomous mobile mechanically deployed spaceport launches to another site to complete one or more missions.

In some embodiments, the autonomous mobile mechanically deployed spaceport launches into flight and navigates to a lunar gateway for refueling at the lunar gateway before returning to the lunar surface to complete one or more missions. In some embodiments, the autonomous mobile mechanically deployed spaceport includes sensors, a radar array, and on-board computer controls that are involved in self-stowing and which assist the autonomous mobile mechanically deployed spaceport to autonomously take-off, navigate, and land, thereby elevating the autonomous mobile mechanically deployed spaceport from being a mere landing pad system to being a spaceport system that is capable of multiple configurations to serve multiple varied missions.

In some embodiments, the autonomous mobile mechanically deployed spaceport includes a stow configuration to serve for a hazardous emergency rescue operation. In some embodiments, the hazardous emergency rescue operation stow configuration includes a collapsible pod that is stowed aboard the autonomous mobile mechanically deployed spaceport. In some embodiments, when the collapsible pod of the hazardous emergency rescue operation stow configuration is attached to a central high-temperature metal grate landing pad, an inflatable habitat, stowed within the base platform, can be attached to the central grate to provide accommodations and life-support for one or more astronauts in need of evacuation from a danger, such as a critical malfunction of their spacecraft or unforeseen situation.

In some embodiments, the autonomous mobile mechanically deployed spaceport includes a propellant refueling module. Due to the size and shape of various autonomous mobile mechanically deployed spaceports, some autonomous mobile mechanically deployed spaceports can stow, or nest, a smaller autonomous mobile mechanically deployed spaceport that is configured as a propellant refueling module, being retrofitted with fuel tanks. In some embodiments, the smaller propellant refueling module configured autonomous mobile mechanically deployed spaceport can hop off an associated larger carrier autonomous mobile mechanically deployed spaceport, deploy on the lunar surface, and expose one or more fuel or propellant tanks. In this way, a lunar lander could utilize the cargo (fuel or propellant tanks) to refuel before ascending to the lunar gateway or return trip to Earth.

In some embodiments, the autonomous mobile mechanically deployed spaceport includes payload delivery services. In some embodiments, the payload delivery services are configured for payload delivery and payload retrieval services. In some embodiments, the payload delivery services are configured for moving equipment to different sites.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
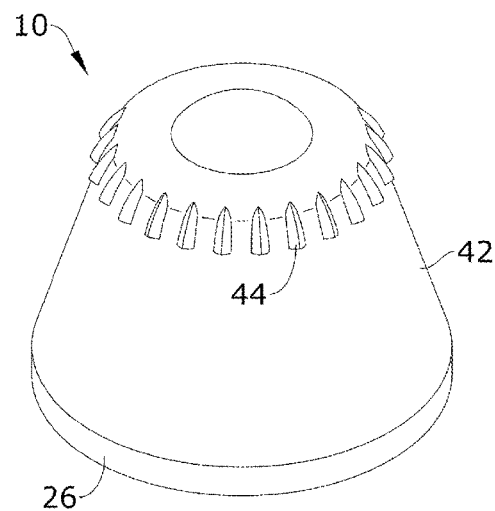
FIG. 1 conceptually illustrates a perspective view of an autonomous mobile mechanically deployed spaceport in a stowed position in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel autonomous mobile mechanically deployed spaceport to provide a self-leveling stable landing pad for lunar and Martian descending and ascending spacecraft. In some embodiments, the autonomous mobile mechanically deployed spaceport alleviates rocket plume blast effects upon surface regolith, including surface soils and volatiles, during spacecraft descent and ascent. In some embodiments, a plurality of flying autonomous mobile mechanically deployed spaceports are deployed as a fleet or swarm.

In some embodiments, the autonomous mobile mechanically deployed spaceport (also known by trade name "Oculus Hive Mobile Spaceport" and by the acronym "OHMS") is designed to be utilized in multiple configurations to serve multiple varied missions. In some embodiments, the autonomous mobile mechanically deployed spaceport is capable of self-stowing to autonomously fold up in preparation for relocation. In some embodiments, the self-stowing capability makes it possible for the autonomous mobile mechanically deployed spaceport to be utilized in any and all of the multiple configurations. In some embodiments, after the autonomous mobile mechanically deployed spaceport is stowed and folded up, the autonomous mobile mechanically deployed spaceport prepares to launch for relocation. In some embodiments, the autonomous mobile mechanically deployed spaceport launches to another site to complete one or more missions. In some embodiments, the autonomous mobile mechanically deployed spaceport launches into flight and navigates to a lunar gateway for refueling at the lunar gateway before returning to the lunar surface to complete one or more missions. In some embodiments, the autonomous mobile mechanically deployed spaceport includes sensors, a radar array, and on-board computer controls that are involved in self-stowing and which assist the autonomous mobile mechanically deployed spaceport to autonomously take-off, navigate, and land, thereby elevating the autonomous mobile mechanically deployed spaceport from being a mere landing pad system to being a spaceport system that is capable of multiple configurations to serve multiple varied missions.

As stated above, a rocket landing on the Moon, which lacks atmosphere to stop high velocity dust, ejects regolith particles in the range of multiple km/s with a significant fraction exceeding lunar escape velocity. Damaging impacts can occur over very long distances, even globally, and can easily reach spacecraft operating at high orbital altitudes, such as the cislunar orbit of the planned NASA Lunar Gateway or any other future lunar gateway orbiting the Moon. Embodiments of the autonomous mobile mechanically deployed spaceport described in this specification solve such problems by way of a fleet, or swarm, of flying landing pad systems that operate somewhat like tugboats at a harbor, enabling the larger vehicles to safely use the port. Being much lower in mass than the spacecraft they service, and designed to vastly reduce blast effects, an autonomous mobile mechanically deployed spaceport navigates, descends, lands, and autonomously deploys to provide a stable landing platform for the larger spacecraft (such as a rocket) to safely descend, land, and launch without producing any additional ejecta.

In some embodiments, the autonomous mobile mechanically deployed spaceport includes a stow configuration to serve for a hazardous emergency rescue operation (also referred to as "HERO" and/or "HERO stow configuration"). In some embodiments, the HERO stow configuration includes a collapsible habitat that is stowed aboard the autonomous mobile mechanically deployed spaceport. In some embodiments, when the collapsible habitat of the HERO stow configuration is attached to a central high-temperature metal grate landing pad, the collapsible habitat can be inflated to provide accommodations and life-support for one or more astronauts in need of evacuation from a danger, such as a critical malfunction of their spacecraft or unforeseen situation.

In some embodiments, the autonomous mobile mechanically deployed spaceport includes a propellant refueling module (also referred to as "PRM"). Due to the size and shape of various autonomous mobile mechanically deployed spaceports, some autonomous mobile mechanically deployed spaceports can stow, or nest, a smaller autonomous mobile mechanically deployed spaceport that is configured as a PRM, being retrofitted with fuel tanks. In some embodiments, the smaller PRM configured autonomous mobile mechanically deployed spaceport can hop off an associated larger carrier autonomous mobile mechanically deployed spaceport, deploy on the lunar surface, and expose one or more fuel or propellant tanks. In this way, a lunar lander could utilize the cargo (fuel or propellant tanks) to refuel before ascending to the lunar gateway or return trip to Earth.

An example of a landing and deployment sequence for deployment of a propellant refueling module is now described in which a twenty meter (20 m) autonomous mobile mechanically deployed spaceport is carrying a smaller twenty-four foot base platform (24 ft/7.3152 m). In this landing and deployment sequence example, an autonomous mobile mechanically deployed spaceport that is configured as a propellant refueling module with a smaller autonomous mobile mechanically deployed spaceport PRM nested inside would land, self-level, and autonomously deploy. This would reveal the autonomous mobile mechanically deployed spaceport PRM nested inside. The autonomous mobile mechanically deployed spaceport PRM could then hop off the larger autonomous mobile mechanically deployed spaceport, landing and remaining undeployed to protect the fuel from the blast effects of a large lunar lander. After the lunar lander has completed engine shut-down, the autonomous mobile mechanically deployed spaceport PRM would fully deploy, exposing its cargo, namely, fuel or propellant tanks, which the lunar lander could then utilize to refuel before ascending to the lunar gateway or for a return trip to Earth.

In some embodiments, the autonomous mobile mechanically deployed spaceport includes payload delivery services (also referred to as "PaDS"). In some embodiments, the PaDS is configured for payload delivery and payload retrieval services. In some embodiments, the PaDS is configured for moving equipment to different sites.

Embodiments of the autonomous mobile mechanically deployed spaceport described in this specification differ from and improve upon currently existing options. In particular, the autonomous mobile mechanically deployed spaceport is a new spacecraft landing pad system that is able to navigate and fly down to a terrestrial surface (including the Moon, Mars, and various Earth surface locations), autonomously unfold for full deployment, and autonomously close up into a closed stowed configuration and take-off for refueling or relocation to engage in other missions. In these and other ways, the autonomous mobile mechanically deployed spaceport is unlike any existing spaceport or landing pad system. While the autonomous mobile mechanically deployed spaceport of the present disclosure is focused on deployments on the Moon and Mars, it is possible to provide Earth-based terrestrial versions of the autonomous mobile mechanically deployed spaceport which are smaller and lighter versions of the autonomous mobile mechanically deployed spaceport and could potentially be configured to act as terrestrial emergency or military landing pads for helicopters or VTOL aircraft deployed to a remote battlefield or while performing rescue or resupply missions in disaster areas such as in the aftermath of wildfires, floods, and other natural disasters. For example, an autonomous mobile mechanically deployed spaceport can be configured for Earth-based terrestrial applications such as an autonomous self-deploying helipad for emergency supply, evacuation, forest fire personnel deployment and retrieval and rescue operations. In particular, the autonomous mobile mechanically deployed spaceport is impervious to rocket plume exhaust, so a forest fire will not harm the autonomous mobile mechanically deployed spaceport for emergency terrestrial helipad-like deployments to aid in forest fire scenarios. Furthermore, military applications may also be considered for Earth-based terrestrial deployments of the autonomous mobile mechanically deployed spaceport in rugged terrain providing a stable landing and re-fueling platform for vertical take-off and landing aircraft such as the V-22 Osprey or F-35 Joint Strike Fighter Aircraft and any number of military or civilian helicopters.

The autonomous mobile mechanically deployed spaceport of the present disclosure may be comprised of the following elements. This list of possible constituent elements is intended to be exemplary only and it is not intended that this list be used to limit the autonomous mobile mechanically deployed spaceport of the present application to just these elements. Persons having ordinary skill in the art relevant to the present disclosure may understand there to be equivalent elements that may be substituted within the present disclosure without changing the essential function or operation of the autonomous mobile mechanically deployed spaceport.

1. Base platform blast shield (30 feet, 9.144 meters)
2. Electric motor driven worm-drive screw jacks
3. Raised platform high-temperature metal landing pad
4. Mechanically deployed and stowed hinged metal articulated control arms
5. Folding high temperature metal panels
6. Ceramic coated high temperature wire rope
7. High-mounted rocket engines The autonomous mobile mechanically deployed spaceport of the present disclosure generally works by a design that can be realized through an innovative origami technique with hinged and actuated, linear motor driven control arms sheathed with folding, or tessellated, high-temperature resistant metal panels. In order to minimize its own launch and landing blast effects, the autonomous mobile mechanically deployed spaceport is fitted with high-mounted and canted rocket engines (most ejecta occur in the final meter of landing), integrated into the exterior shell of the spacecraft and folding out of the way when the landing pad deploys. The base platform of the autonomous mobile mechanically deployed spaceport acts as a blast shield. Its cone-shaped surface redirects, attenuates, and vents rocket exhaust plumes away from the landing spacecraft without disturbing the underlying regolith, while also dispersing and redirecting shockwaves from engine ignition and shutoff events and ducting both acoustic and thermal energy away from the spacecraft's baseplate and structure.

In some embodiments, the autonomous mobile mechanically deployed spaceport is able to provide navigational beacons, optical targets for precision autonomous landing, lighting, and videography services for incoming spacecraft. In some embodiments, the autonomous mobile mechanically deployed spaceport includes or is fitted with backup communications systems, emergency supplies, and tools, and acts as a lunar harbor service vehicle. As a lunar harbor service vehicle, the autonomous mobile mechanically deployed spaceport is able to provide emergency services to other landing locations and missions when needed, such as when or if critical failures endanger a crew exploring a distant site.

In some embodiments, the autonomous mobile mechanically deployed spaceport is scalable by design. In some embodiments, the autonomous mobile mechanically deployed spaceport utilizes various sizes of base platforms, differing lengths of control arms, linear motor torque, and screw jack components. Various sizes of any such components of the autonomous mobile mechanically deployed spaceport are easily fabricated and manufactured, much like automobile manufacturers. The autonomous mobile mechanically deployed spaceport service will be central in the setup phase of new outposts delivering infrastructure to construct permanent landing pads, and for human-class sortie missions all over the Moon where permanent infrastructure is not available. In some embodiments, the autonomous mobile mechanically deployed spaceport is configured for landing pads sized from nine meters (9 m) in diameter for smaller robotic prospecting and exploratory missions, to thirty-seven meters (37 m) in diameter for larger cargo and human-tended spacecraft delivering equipment, tools, and supplies for mining operations or critical infrastructure deployment for human settlement of the Moon or Mars.

By way of example, FIG. 1 conceptually illustrates a perspective view of an autonomous mobile mechanically deployed spaceport 10 shown folded up in a stowed position or stow configuration. As shown in this figure, the autonomous mobile mechanically deployed spaceport 10 includes a landing pad base 26, an exterior blast shield 42, and a plurality of high-mounted rocket engines 44 (shown with fairings). In the stow configuration, the autonomous mobile mechanically deployed spaceport 10 is cone-shaped and the high-mounted rocket engines 44 are canted, which causes most of the exhaust plumes to spread away from the landing pad base 26 during take-off and landing. In some embodiments, the landing pad base 26 of the autonomous mobile mechanically deployed spaceport 10 measures thirty feet (or 9.144 meters) across, while folded up in the stow configuration.

After the landing pad base 26 is stabilized on the surface after descent and landing, the autonomous mobile mechanically deployed spaceport 10 unfolds for deployment. By way of example, FIG. 2 conceptually illustrates a perspective view of the autonomous mobile mechanically deployed spaceport 10 in a deployed position after fully unfolding from the stow position. As shown in this figure, the autonomous mobile mechanically deployed spaceport 10 includes a plurality of castellated control arms 12, a spaceport central landing pad 14, a landing pad hole 16, a plurality of light beacon/navigational transponder/video camera bollards 18, a collapsible wire rope mesh outer landing pad 20, and a tessellated perforated metal plume vent 22. In some embodiments, the plurality of castellated control arms 12 wrap around the tessellated perforated metal plume vent 22 and are connected to the collapsible wire rope mesh outer landing pad 20 when unfolding from the stowed configuration to the fully open deployment position. In some embodiments, each bollard in the plurality of light beacon/navigational transponder/video camera bollards 18 includes at least one light beacon, a navigational transponder device, and a video camera. In some other embodiments, the plurality of light beacon/navigational transponder/video camera bollards 18 includes at least one light beacon, at least one navigational transponder device, and at least one video camera, with each bollard in the plurality of light beacon/navigational transponder/video camera bollards 18 including at least one of a light beacon, a navigational transponder device, and a video camera. For example, in some cases, each bollard of the autonomous mobile mechanically deployed spaceport 10 includes a combination of a light beacon, a navigational transponder, and a video camera, while in other cases, each bollard of the autonomous mobile mechanically deployed spaceport 10 includes a light beacon, a navigational transponder, or a video camera, or a combination pair of two (e.g., light beacon+transponder, light beacon+video camera, or transponder+video camera), but not necessarily a combination of all three. In some embodiments, the landing pad hole 16 is centered in the spaceport central landing pad 14 to allow rocket blast and exhaust to enter when a spacecraft is taking off from the autonomous mobile mechanically deployed spaceport 10. As described in greater detail below, by reference to FIG. 9, the landing pad hole 16 exposes a blast cone 48 that directs rocket blast and exhaust from the center of the spaceport central landing pad 14 out through the vents of the tessellated perforated metal plume vent 22 and away from the autonomous mobile mechanically deployed spaceport 10. In some embodiments, the full deployed autonomous mobile mechanically deployed spaceport 10 measures sixty feet, two and five-eighths inches (or 20.1168 m) across, while fully unfolded in the deployed position.

Figure 3:
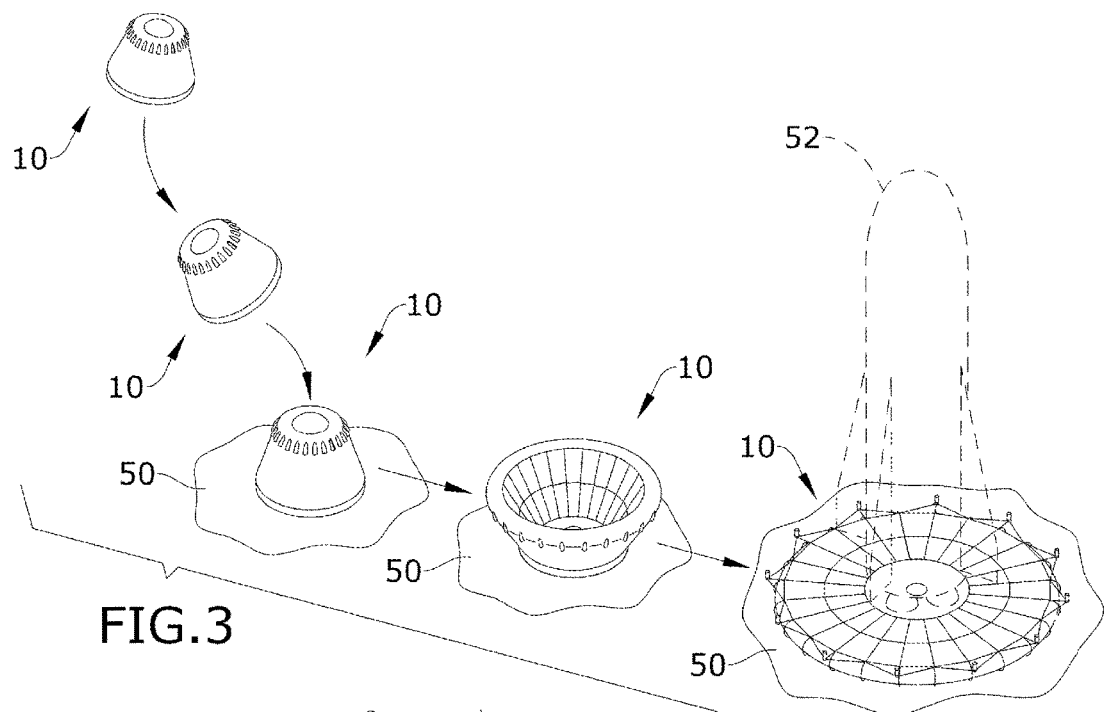
FIG. 3 conceptually illustrates a schematic view of a path from powered descent to full deployment of an autonomous mobile mechanically deployed spaceport in some embodiments.

An example of the autonomous mobile mechanically deployed spaceport 10 autonomously flying, navigating to a location, landing at the location, and unfolding for deployment as a landing pad for a spacecraft is described next. In particular, FIG. 3 conceptually illustrates a schematic view of a path from powered descent to full deployment of an autonomous mobile mechanically deployed spaceport. As shown in this figure, the autonomous mobile mechanically deployed spaceport 10 descends to a landing surface 50. The landing surface 50 may be the surface of the Moon or Mars, or another terrestrial landing spot (e.g., Earth). Once positioned on the landing surface 50, autonomous mobile mechanically deployed spaceport 10 starts to unfold for deployment. At last, the autonomous mobile mechanically deployed spaceport 10 is fully deployed on the landing surface 50, such that a rocket 52 or other spacecraft may use the autonomous mobile mechanically deployed spaceport 10 as a landing pad (and subsequently, as a launch pad).

Figure 2:
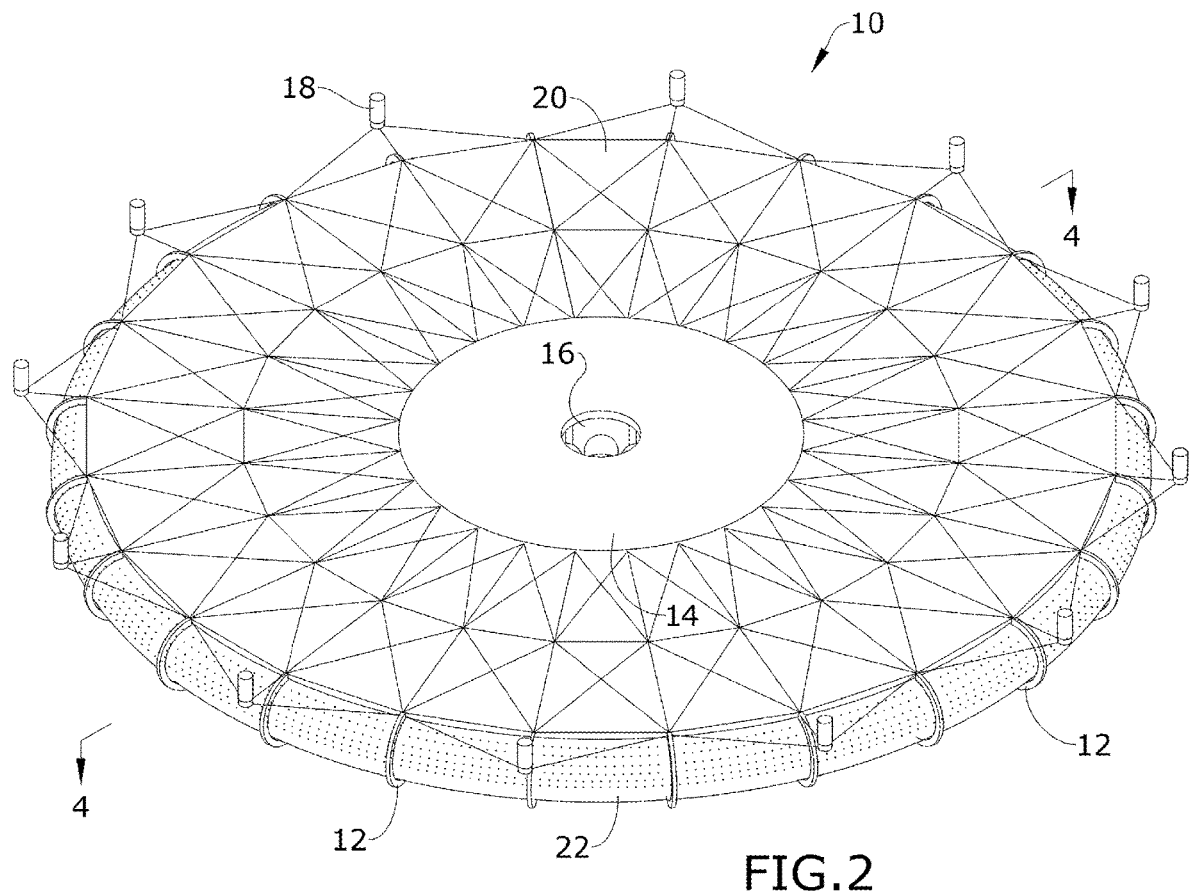
FIG. 2 conceptually illustrates a perspective view of the autonomous mobile mechanically deployed spaceport in a deployed position in some embodiments.

A more detailed view of the autonomous mobile mechanically deployed spaceport 10 in the deployed position is now described by reference to FIG. 4. Specifically, FIG. 4 conceptually illustrates a section view of the autonomous mobile mechanically deployed spaceport in the deployed position, taken along line 4-4 as shown in FIG. 2 and with panels shown as hidden for clarity. As shown in this figure, the autonomous mobile mechanically deployed spaceport 10 includes the plurality of castellated control arms 12, a plurality of tessellated inner metal panels 24 (shown as dashed lines, so as hidden for clarity), the landing pad base 26, a plurality of retractable, self-leveling feet 28, a central landing pad pedestal 30, a plurality of control arm brackets 32, a plurality of motors 34 connected to the plurality of control arm brackets 32, a plurality of electric motor driven worm-drive screw jacks 36 extending out from the plurality of motors 34, a plurality of inner propellant tanks 38, and a plurality of outer propellant tanks 40. The plurality of tessellated inner metal panels 24 are described in greater detail below, by reference to FIG. 8, which explicitly illustrates the plurality of tessellated inner metal panels 24, and by reference to FIG. 9, which demonstrates a downward slanted alignment of the tessellated inner metal panels 24 when the autonomous mobile mechanically deployed spaceport 10 is fully unfolded in the deployed position. Also, the plurality of castellated control arms 12, the landing pad base 26, and the retractable self-leveling feet 28 are described in greater detail below, by reference to FIGS. 5-7 and 9. Additionally, the central landing pad pedestal 30, the plurality of motors 34, the plurality of electric motor driven worm-drive screw jacks 36, and the plurality of inner propellant tanks 38 are described in more detail below by reference to FIG. 9.

In at least one embodiment, the autonomous mobile mechanically deployed spaceport includes high-temperature resistant metal bar grates for the landing surface, which unfold simultaneously after the autonomous mobile mechanically deployed spaceport lands on site, levels its base platform, then opens to create a safe, stable surface for descending and ascending robotic or human-occupied spacecraft. The outer ring of the landing pad utilizes ceramic-coated wire rope and mesh under tension extending out from the high-temperature bar grates and connecting to the ends of the control arms. This operates on similar principles as the metal bar grate concept by utilizing retractable pedestal assemblies that lessen the clear span between cable supports, providing additional strength to accommodate the point-loading of various landing gear configurations. This imaginative high-temperature tensile system also prevents erosion of metal components and allows for the nesting of a smaller diameter autonomous mobile mechanically deployed spaceport inside of a larger autonomous mobile mechanically deployed spaceport to fully utilize payload volume during launch from Earth.

In some embodiments, the autonomous mobile mechanically deployed spaceport includes advanced navigation and flight control systems and diagnostics routines, which allow the autonomous mobile mechanically deployed spaceport to operate autonomously. Upon descent, landing, and engine shut-off, the autonomous mobile mechanically deployed spaceport self-levels its base platform on landing pods (landing pads) and deploys its linear motor driven control arms, unfolding to create a safe, stable landing pad that reduces rocket exhaust shockwave and blast effects by 99.97%.

Figure 5:
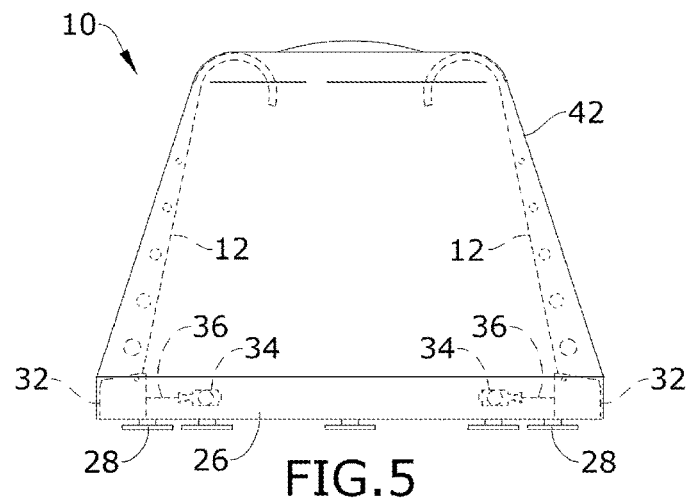
FIG. 5 conceptually illustrates a side view of the autonomous mobile mechanically deployed spaceport in the stowed position in some embodiments.

By way of example, FIG. 5 conceptually illustrates a side view of the autonomous mobile mechanically deployed spaceport in the stowed position. As shown in this figure, the autonomous mobile mechanically deployed spaceport 10 includes the plurality of castellated control arms 12 (shown in dashed lines as interior), the landing pad base 26, a plurality of retractable self-leveling feet 28, the plurality of control arm brackets 32 (shown in dashed lines as interior), the plurality of motors 34 (shown in dashed lines as interior) connected to the plurality of control arm brackets 32, the plurality of electric motor driven worm-drive screw jacks 36 (shown in dashed lines as interior) in retracted position with respect to the plurality of motors 34, and the exterior blast shield 42 (which forms the cone-shape by surrounding the autonomous mobile mechanically deployed spaceport 10). In some embodiments, the plurality of retractable self-leveling feet 28 are adjusted to stabilize the autonomous mobile mechanically deployed spaceport 10 and provide a landing pad surface that is level with respect to the planetary body (the Moon, Mars, Earth, etc.) at the particular surface location of the autonomous mobile mechanically deployed spaceport 10.

Figure 6:
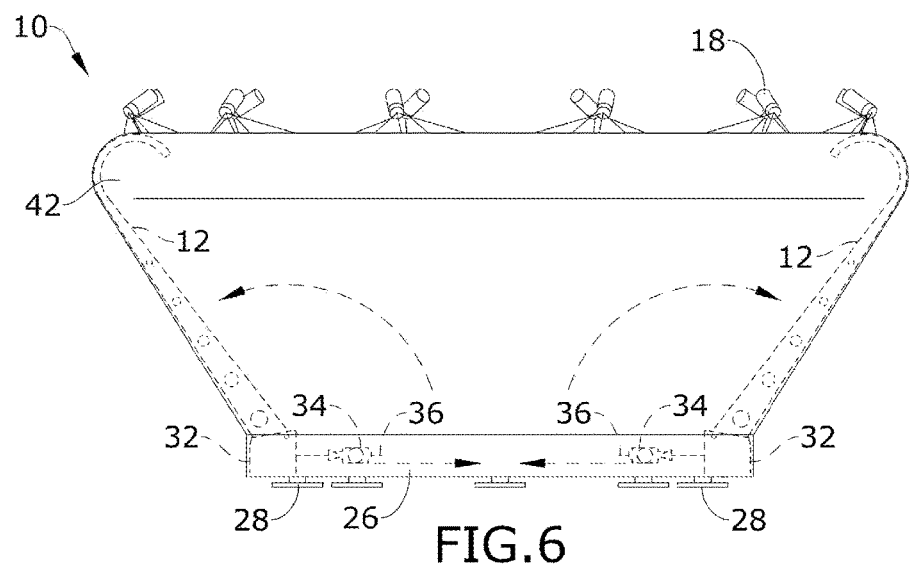
FIG. 6 conceptually illustrates a side view of the autonomous mobile mechanically deployed spaceport demonstrating movement of arms while unfolding for deployment in some embodiments.

Now turning to another example, FIG. 6 conceptually illustrates a side view of the autonomous mobile mechanically deployed spaceport demonstrating movement of arms while unfolding for deployment. The autonomous mobile mechanically deployed spaceport 10 shown in this figure demonstrates the plurality of castellated control arms 12 moving outward and downward (direction of dashed curved arrows) when the plurality of electric motor driven worm-drive screw jacks 36 extend out (direction of dashed straight arrows) from the plurality of motors 34 connected to the plurality of control arm brackets 32. As the exterior blast shield 42 opens up with the outward/downward movement of the control arms 12, the plurality of light beacon/navigational transponder/video camera bollards 18 are hoisted out to view.

Figure 7:
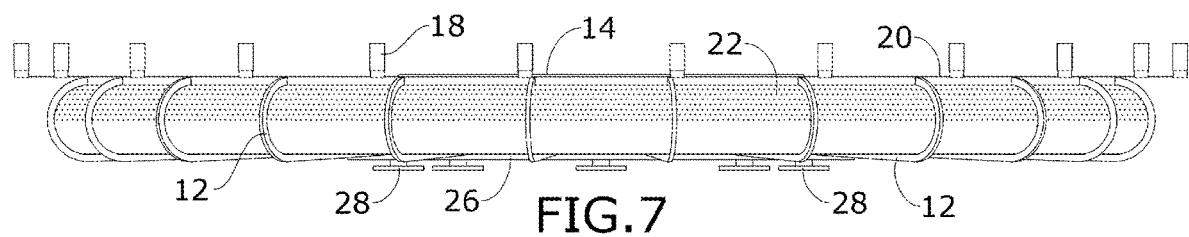
FIG. 7 conceptually illustrates a side view of the autonomous mobile mechanically deployed spaceport completely unfolded for full deployment in some embodiments.

Now turning to another view, FIG. 7 conceptually illustrates a side view of the autonomous mobile mechanically deployed spaceport completely unfolded for full deployment. At this point, the autonomous mobile mechanically deployed spaceport 10 has stabilized by adjusting the retractable self-leveling feet and completely unfolded for full landing pad deployment. In the deployment position, the plurality of light beacon/navigational transponder/video camera bollards 18 line an outer perimeter of a top side of the autonomous mobile mechanically deployed spaceport 10 (on the side in which a spacecraft lands and takes off) being attached the collapsible wire rope mesh outer landing pad 20. The spaceport central landing pad 14 is also disposed along the top side of the autonomous mobile mechanically deployed spaceport 10. Under the top side is the tessellated perforated metal plume vent 22, which the plurality of castellated control arms 12 wrap around to unfold during deployment.

While the plurality of retractable self-leveling feet 28 shown in FIGS. 5-7 all appear at the same level, the height of each of the retractable self-leveling feet 28 may be adjusted differently, depending on the surface location at which the autonomous mobile mechanically deployed spaceport 10 is positioned. In some embodiments, the height of individual feet among the plurality of retractable self-leveling feet 28 are automatically adjusted by the autonomous mobile mechanically deployed spaceport 10 until the landing pad base 26 and the spaceport central landing pad 14 are both parallel and level with respect to the planetary body (the Moon, Mars, Earth, etc.) at the particular surface location at which the autonomous mobile mechanically deployed spaceport 10 is deployed. For example, if the surface location is on the outer edge of a lunar crater, the ground at that location may have a slight incline/decline with respect to the Moon at large, so some of the retractable self-leveling 28 may autonomously adjust or retract to ensure that the autonomous mobile mechanically deployed spaceport 10 is level with respect to the Moon, or specifically, perpendicular to lunar gravitational force at the surface location.

To make the autonomous mobile mechanically deployed spaceport of the present disclosure, a person may fabricate and manufacture the components described above, and then assemble all components as illustrated. The sizes and dimensions may proportionally vary, but a high degree of compliance with specific practices is needed. Specifically, strict NASA protocols must be adhered to for any spacecraft, including the autonomous mobile mechanically deployed spaceport.

Figure 8:
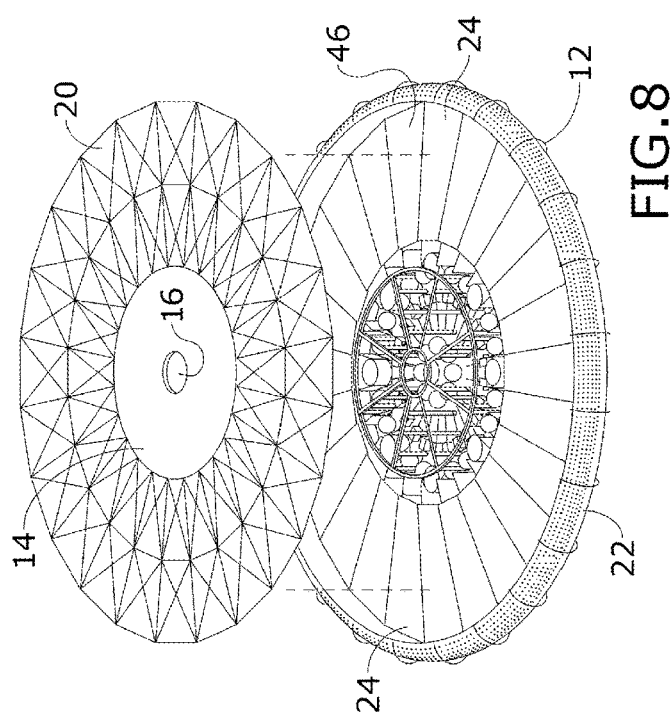
FIG. 8 conceptually illustrates a partial exploded view of the autonomous mobile mechanically deployed spaceport in some embodiments.

By way of example, FIG. 8 conceptually illustrates a partial exploded view of the autonomous mobile mechanically deployed spaceport. Specifically, the autonomous mobile mechanically deployed spaceport shown in this figure includes the spaceport central landing pad 14 with the landing pad hole 16 in the middle. The collapsible wire rope mesh outer landing pad 20, within which is the spaceport central landing pad 14 and the landing pad hole 16 in the middle of the spaceport central landing pad 14. A person making the autonomous mobile mechanically deployed spaceport would layer the combination of the collapsible wire rope mesh outer landing pad 20 and the spaceport central landing pad 14 with the landing pad hole 16 onto a combination of bottom components which include the plurality of castellated control arms 12, the tessellated perforated metal plume vent 22, and the plurality of tessellated inner metal panels 24. As one can see, when the combination of the collapsible wire rope mesh outer landing pad 20 and the spaceport central landing pad 14 with the landing pad hole 16 is removed from the combination of bottom components (namely, the plurality of castellated control arms 12, the tessellated perforated metal plume vent 22, and the plurality of tessellated inner metal panels 24), a blast cone capture pocket 46 is revealed. In some embodiments, spacecraft blast and exhaust are directed through the landing pad hole 16 during take off or landing of a spacecraft at or from the spaceport central landing pad 14, which fills the blast cone capture pocket 46 with the resulting blast and exhaust effects, which are thereafter expelled out of the autonomous mobile mechanically deployed spaceport 10 through the tessellated perforated metal plume vent 22.

Figure 4:
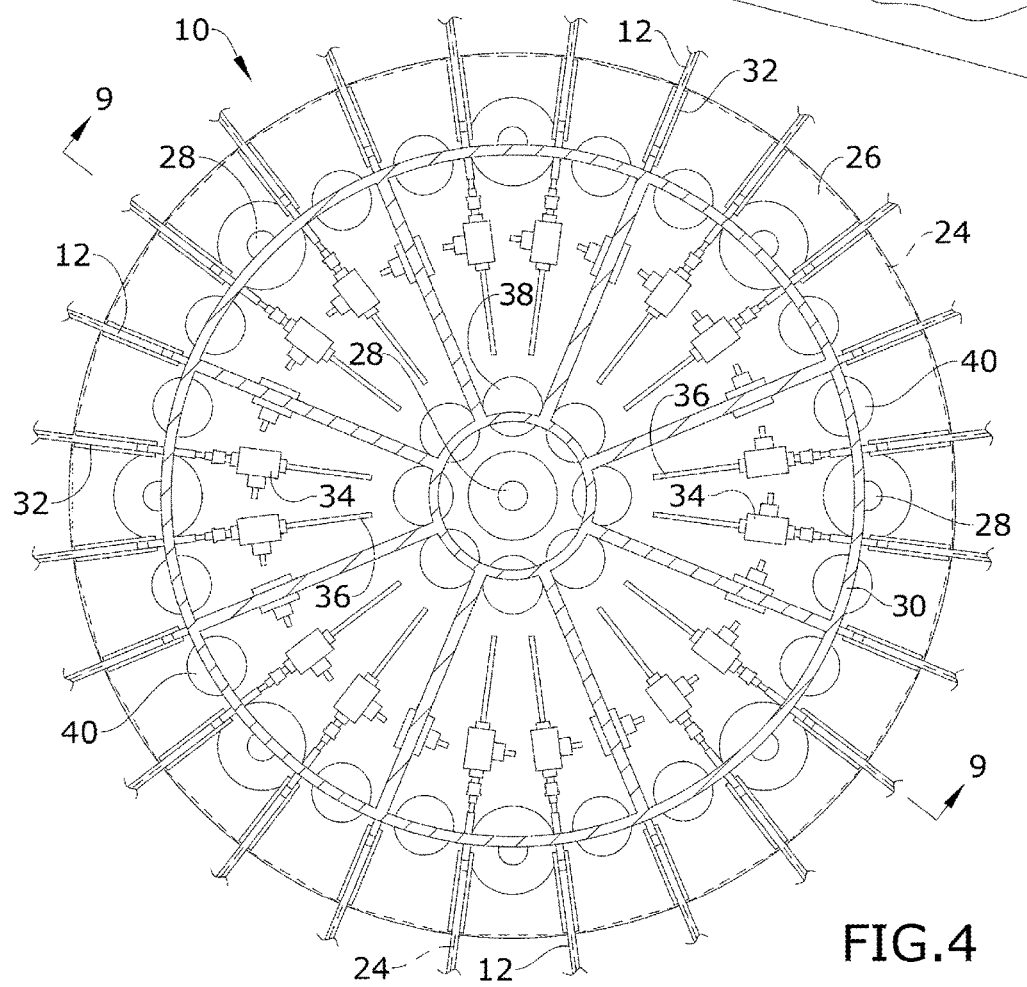
FIG. 4 conceptually illustrates a section view of the autonomous mobile mechanically deployed spaceport in the deployed position, taken along line 4-4 as shown in FIG. 2 and with panels shown as hidden for clarity.
Figure 9:
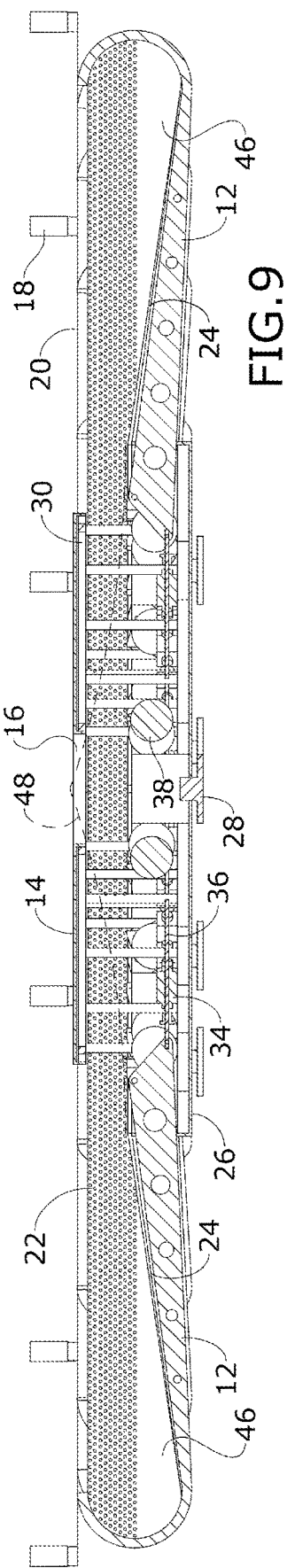
FIG. 9 conceptually illustrates a section view of the autonomous mobile mechanically deployed spaceport completely unfolded for full deployment, taken along line 9-9 as shown in FIG. 4.

In a different exemplary view, FIG. 9 conceptually illustrates a section view of the autonomous mobile mechanically deployed spaceport completely unfolded for full deployment, taken along line 9-9 as shown in FIG. 4. As shown in this figure, the autonomous mobile mechanically deployed spaceport 10 is in the deployed position, fully unfolded as a landing pad. Specifically, the autonomous mobile mechanically deployed spaceport 10 shown in this figure includes the plurality of castellated control arms 12, the spaceport central landing pad 14, the landing pad hole 16, the plurality of light beacon/navigational transponder/video camera bollards 18, the collapsible wire rope mesh outer landing pad 20, the tessellated perforated metal plume vent 22, the plurality of tessellated inner metal panels 24, the landing pad base 26, the plurality of retractable self-leveling feet 28, the central landing pad pedestal 30, the plurality of motors 34, the plurality of electric motor driven worm-drive screw jacks 36, the plurality of inner propellant tanks 38, the blast cone capture pocket 46, and the blast cone 48.

Notably, the plurality of tessellated inner metal panels 24 are laid out in a downward slanted alignment when the autonomous mobile mechanically deployed spaceport 10 is fully unfolded in the deployed position. Additionally, the apex of the blast cone 48 penetrates the landing pad hole 16, leaving a gap that is sufficient to direct rocket blast and exhaust fumes (and any residual gases, pressures, or shock waves) down into the blast cone capture pocket 46. Also, the perforated ventilation holes shown along the tessellated perforated metal plume vent 22 are positioned at an elevated level that is directly below the combination of the collapsible wire rope mesh outer landing pad 20 and the spaceport central landing pad 14 with the landing pad hole 16, but is elevated considerably above the landing pad base 26. In this way, the rocket blast effects and exhaust (fumes, gases, etc.) that get directed into the blast cone capture pocket 46 by the blast cone 48 can be emitted outward and exterior to the autonomous mobile mechanically deployed spaceport 10 at an offset projection that does not directly blast the lunar (or Martian) surface soils, regolith, etc.

To use the autonomous mobile mechanically deployed spaceport of the present disclosure, one would deploy a fleet, or a swarm, of flying autonomous mobile mechanically deployed spaceports that operate somewhat like tugboats at a harbor, enabling the larger vehicles (spacecrafts) to safely use the port (spacecraft landing pad). Being much lower in mass than the spacecraft they service, and designed to vastly reduce blast effects of spacecraft descent and ascent, the autonomous mobile mechanically deployed spaceport of some embodiments lands on the surface and autonomously deploys a stable landing platform for the larger spacecraft to safely descend, land, and launch without producing any additional ejecta. In some embodiments, the autonomous mobile mechanically deployed spaceport returns to the lunar gateway or another cislunar station for refueling and reuse each time. When lunar propellant mining comes online, the autonomous mobile mechanically deployed spaceport transitions its base to the mining site at the surface where it can refuel, thereby performing more efficiently for suborbital hops. Another benefit of the compliant tensile-based landing surface is the easing of landing gear design requirements on future lunar landers, resulting in smaller, less complex spacecraft. In general, migrating functionality and requirements from the lander into the autonomous mobile mechanically deployed spaceport infrastructure provides extensive economic and safety benefits. It is tantamount to differentiate between designing airplanes that rely on airports versus designing airplanes that must land everywhere without airports.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A mobile spaceport landing pad system that is a mechanically deployed unfolding flying landing pad to allow spacecraft to land on the Moon and Mars and which alleviates rocket plume blast effects upon surface soils and volatiles, said mobile spaceport comprising:
   a base platform that acts as a blast shield with a cone-shaped surface that redirects, attenuates, and vents rocket exhaust plumes away from a spacecraft that is landing without disturbing regolith of the Moon or Mars and redirects shockwaves from engine ignition and shutoff events of the spacecraft and ducts acoustic and thermal energy away from the spacecraft;
   electric motor driven worm-drive screw jacks;
   a raised platform high-temperature metal landing pad;
   mechanically deployed and stowed hinged metal articulated control arms;
   folding high temperature metal panels that sheath the control arms;
   ceramic coated high temperature wire rope; and
   high-mounted rocket engines that are integrated into an exterior shell formed by the metal panels and which fold out of the way in an origami style during deployment of the landing pad system.

2. The mobile spaceport landing pad system of claim 1, wherein the mechanically deployed and stored hinged metal articulated control arms, the folding high temperature metal panels, and the ceramic coated high temperature wire rope fold up from a fully deployed configuration into a stow configuration of the mobile spaceport landing pad system, wherein the high-mounted rocket engines are exposed and the exterior shell formed by the metal panels and the base platform encapsulates the electric motor driven worm-drive screw jacks, the raised platform high-temperature metal landing pad, the mechanically deployed and stowed hinged metal articulated control arms, and the ceramic coated high temperature wire rope in the stow configuration of the mobile spaceport landing pad system.

3. The mobile spaceport landing pad system of claim 2, wherein the fully deployed configuration includes a measurable deployed width of sixty feet, two and five-eighths inches.

4. The mobile spaceport landing pad system of claim 2, wherein the stow configuration includes a measurable stow width of thirty feet.

5. An autonomous configurable mobile mechanically deployed spaceport that navigates to and lands at a lunar surface location in a stowed configuration and unfolds into a fully deployed configuration to provide a lunar landing pad that alleviates rocket plume blast effects upon surface soils and volatiles for descending and ascending spacecraft, said autonomous configurable mobile mechanically deployed spaceport comprising:

a landing pad base that is a bottom exterior surface of the autonomous configurable mobile mechanically deployed spaceport in the stowed configuration and is stabilized and leveled upon landing at the lunar surface location;

an exterior blast shield that forms a cone-shaped exterior surrounding surface of the autonomous configurable mobile mechanically deployed spaceport in the stowed configuration;

a plurality of high-mounted, canted rocket engines disposed along the exterior blast shield, wherein the plurality of high-mounted, canted rocket engines are visible around the exterior blast shield in the stowed configuration, wherein the plurality of high-mounted, canted rocket engines are hidden from view in the fully deployed configuration;

a tessellated perforated metal plume vent that forms an outer perimeter of the autonomous configurable mobile mechanically deployed spaceport in the fully deployed configuration and disperses rocket blast and exhaust away from the autonomous configurable mobile mechanically deployed spaceport when a spacecraft is taking off;

a blast cone that directs rocket blast and exhaust out through the tessellated perforated metal plume vent when the spacecraft is taking off;

a spaceport central landing pad for spacecraft descent and ascent, wherein the spaceport central landing pad comprises a centered landing pad hole to channel rocket blast and exhaust to the blast cone during spacecraft ascent;

a collapsible wire rope mesh outer landing pad that expands in connection with the tessellated perforated metal plume vent at the outer perimeter and the spaceport central landing pad, said collapsible wire rope mesh outer landing pad expanding to support the autonomous configurable mobile mechanically deployed spaceport in the fully deployed configuration;

a plurality of bollards that are connected to the collapsible wire rope mesh outer landing pad and are exposed at the perimeter of the autonomous configurable mobile mechanically deployed spaceport in the fully deployed configuration; and a plurality of castellated control arms that are wrapped around the tessellated perforated metal plume vent and connected to the collapsible wire rope mesh outer landing pad when the autonomous configurable mobile mechanically deployed spaceport is unfolding from the stowed configuration to the fully deployed configuration.

6. The autonomous configurable mobile mechanically deployed spaceport of claim 5, wherein the plurality of bollards enable the autonomous configurable mobile mechanically deployed spaceport to provide lighted optical targets for precision autonomous landing, navigation services, and videography services for descending spacecraft.

7. The autonomous configurable mobile mechanically deployed spaceport of claim 6, wherein each bollard in the plurality of bollards comprises at least one of a light beacon, a navigational transponder, and a video camera.

8. The autonomous configurable mobile mechanically deployed spaceport of claim 6, wherein each bollard in the plurality of bollards comprises a light beacon, a navigational transponder, and a video camera.

9. The autonomous configurable mobile mechanically deployed spaceport of claim 5 further configured to provide life-support and hazardous emergency rescue accommodations for an astronaut in danger when the autonomous configurable mobile mechanically deployed spaceport inflates from the stow configuration.

10. The autonomous configurable mobile mechanically deployed spaceport of claim 5 further configured to provide refueling services.

* * * * *